(12) United States Patent
Mutsuro et al.

(10) Patent No.: US 8,477,850 B2
(45) Date of Patent: Jul. 2, 2013

(54) INFORMATION RECORDING/REPRODUCING APPARATUS

(75) Inventors: Yasuo Mutsuro, Yokohama (JP); Keisuke Inata, Ebina (JP); Hiroki Mizosoe, Kawasaki (JP); Akihito Nishizawa, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 1352 days.

(21) Appl. No.: 12/103,734

(22) Filed: Apr. 16, 2008

(65) Prior Publication Data

US 2008/0309775 A1 Dec. 18, 2008

(30) Foreign Application Priority Data

Jun. 14, 2007 (JP) ................. 2007-156959

(51) Int. Cl.
*H04N 7/12* (2006.01)
*H04L 12/28* (2006.01)

(52) U.S. Cl.
USPC ..................... 375/240.24; 370/412

(58) Field of Classification Search
USPC ............ 370/485–487; 375/240.26, 240.28, 375/240.2, 240.02, 240.16; 348/240.2, 461; 386/46, 111, 117, 27, 33, 112; 382/232
See application file for complete search history.

(56) References Cited

U.S. PATENT DOCUMENTS 7,512,324 B2 * 3/2009 Takahashi et al. ............ 386/328
7,852,948 B2 * 12/2010 Suzuki ..................... 375/240.26
7,953,281 B2 * 5/2011 Yoshida et al. ............... 382/232
2002/0191951 A1 * 12/2002 Sodeyama et al. ............. 386/46
2006/0280496 A1 * 12/2006 Tanoue ......................... 396/287

FOREIGN PATENT DOCUMENTS

JP 2007-011907 1/2007

* cited by examiner

*Primary Examiner* — Hanh N Nguyen
(74) *Attorney, Agent, or Firm* — Antonelli, Terry, Stout & Kraus, LLP.

(57) ABSTRACT

A video camera is provided not only with means for receiving any general captured images but also with means for receiving images from any other video input source. The video camera is also provided with an image input arbitration section that captures, after arbitration, video data coming from these two input means, and stores the resulting data into a memory. As such, when the video input source is a video output terminal of a car navigation system, the screen of the car navigation system, i.e., map information, can be stored in a memory together with a user's captured image. When the video camera is used for monitoring, data capturing into a memory is also enabled when the video input source is a medium already carrying therein map image data, e.g., USB flash memory and SD card, and means for reading the map image data from the medium. The data in the memory is subjected to a process of compression and encoding as moving images so that the image of position information and the user's captured image can be processed as a set of moving images. This accordingly enables to provide a system and method for recording and reproducing a set of moving images of the combination of an image of position information and a user-captured image with no need for a complicated process.

20 Claims, 9 Drawing Sheets

INFORMATION RECORDING/REPRODUCING APPARATUS

CLAIM OF PRIORITY

The present application claims priority from Japanese application serial no. JP 2007-156959, filed on Jun. 14, 2007, the content of which is hereby incorporated by reference into this application.

BACKGROUND

The present invention relates to a system and method for recording and reproducing a set of moving images of the combination of an image of position information and an image captured by a user.

The recent progresses of digitalization are remarkable for still and video cameras, and users thus find it very easy to use such cameras for image capturing and recording, thereby allowing recording of a large amount of video information. The concern here is that, with a large amount of video captured during a long trip, for example, users may not remember where they have captured which video after the trip. If this is the case, the users may find it very convenient and useful for later viewing and editing if each video is with its map information in a piece of video data. This is also true for data captured by video cameras disposed at a plurality of places for monitoring use, and the video data is considered useful if it carries therein any captured video together with an image of position information.

The technology similar thereto is exemplified by drive recording, which is recently adopted for use in taxies and others. With drive recording, situation data including position information and image-capturing data are recorded at any image-capturing timing that is automatically determined. The problem with such a technology is that, because the image-capturing timing is determined automatically, there is no way in some cases of avoiding recording a large amount of unneeded data. For prevention of such a problem, Patent Document 1 (JP-A-2007-11907) describes the technology with a learning function for selection of recorded data, and after a user captures any image, he or she inputs needed/unneeded information so that the learning is made about image capturing.

SUMMARY

The problem of the above technology is that, because images are captured in an automatic manner as such, there remains some doubt about a complete matching with users' needs, and it is thus considered not suitable for users to freely capture their desired images together with map information.

Therefore, an object of the present invention is to provide a system and method for recording and reproducing a set of moving images of the combination of an image of position information and a user-captured image with no need for a complicated process.

In an aspect of the invention, a video camera is provided not only with means for receiving any general captured images but also with means for receiving images from any other video input source. The video camera is also provided with an image input arbitration section that captures, after arbitration, video data coming from these two input means, and stores the resulting data into a memory. If this is the configuration, when the video input source is a video output terminal of a car navigation system, the screen of the car navigation system, i.e., map information, can be stored in a memory together with a user's captured image. When the video camera is used for monitoring, data capturing into a memory is also enabled when the video input source is a medium already carrying therein map image data, e.g., USB (Universal Serial Bus) flash memory and SD (Secure Digital) card, and means for reading the map image data from the medium. The data in the memory is subjected to a process of compression and encoding as moving images so that the image of position information and the user's captured image can be processed as a set of moving images.

According to the aspect of the invention, with no need for a complicated process, an image of position information and a user-captured image can be recorded and reproduced as a set of moving images.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

Most preferred embodiments of the invention are described.

In the below, embodiments of an image recording/reproducing system and method of the invention are described by referring to the accompanying drawings.

First Embodiment

Figure 1:
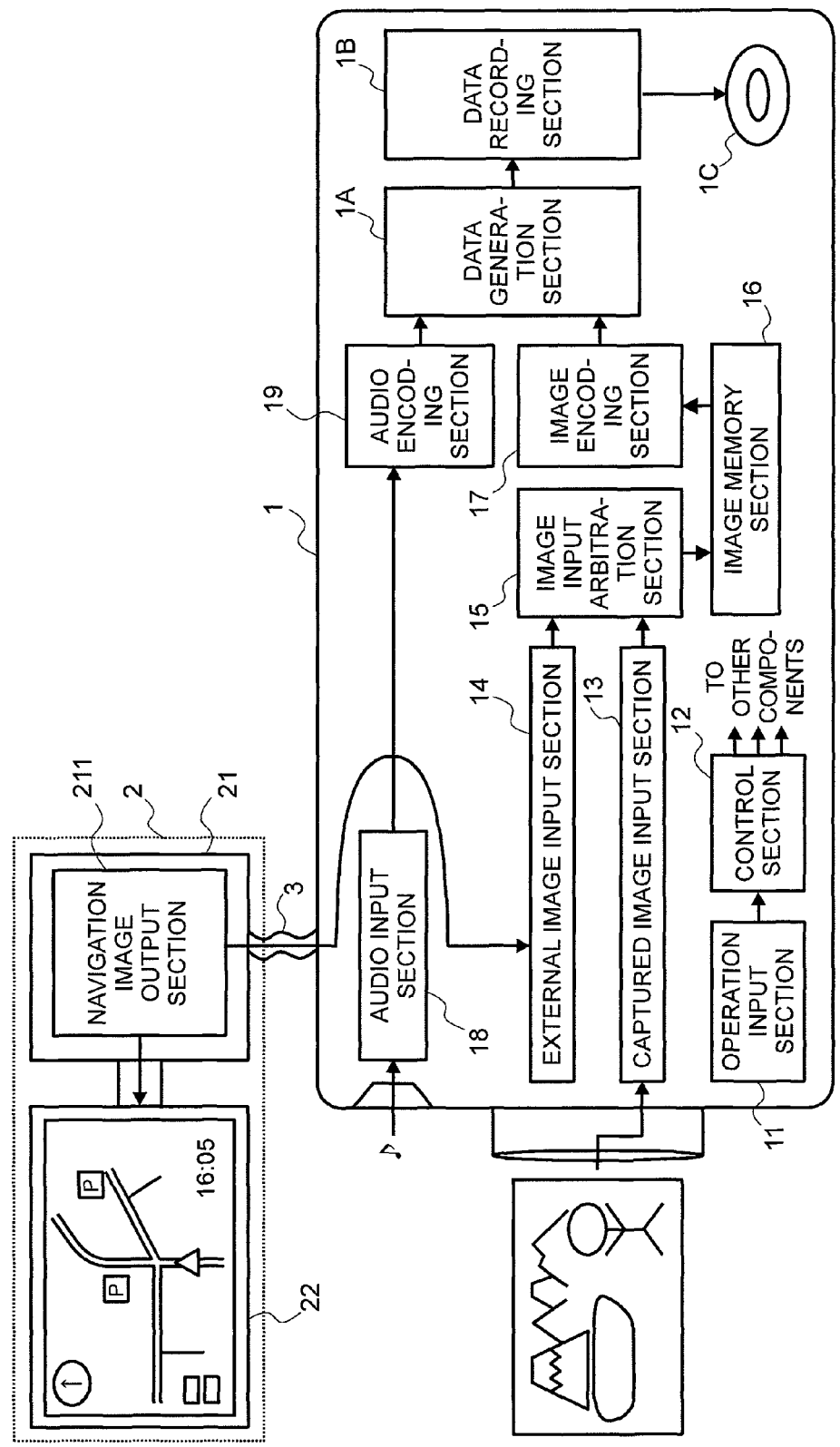
FIG. 1 is a diagram showing the configuration of an image recording/reproducing system of a first embodiment.

A first embodiment is now described. In this embodiment, referring to FIGS. 1 to 3, described is the operation after a user issues an image-capturing command but before image capturing is taken place. FIG. 1 shows an image recording/reproducing system in the first embodiment of the invention. In FIG. 1, a video camera 1 is configured to include an operation input section 11, a control section 12, a captured image input section 13, an external image input section 14, an image input arbitration section 15, an image memory section 16, an image encoding section 17, an audio input section 18, an audio encoding section 19, a data generation section 1A, a data recording section 1B, and a recording medium 1C. The operation input section 11 is exemplified by a button and a touch panel for allowing a user to directly input various types of commands including the image-capturing command. The control section 12 applies control over other components in charge of image capturing. The captured image input section 13 receives a target image of user's image capturing, and outputs data of the resulting captured image after digitalization thereof. The external video input section 14 receives video coming from a navigation system 2 that will be described later. The image input arbitration section 15 arbitrates the order of the image data, i.e., the captured image data coming from the captured image input section 13 and navigation image data coming from the external image input section 14, and outputs the resulting data. The image memory section 16 stores, on a temporary basis, the data coming from the image input arbitration section 15. The image encoding section 17 reads the image data from the image memory section 16, subjects the image data to image compression and encoding by MPEG (Moving Picture Expert Group) 2 and H.264, for example, and outputs the resulting encoded image data. The audio input section 18 receives a target audio of user's image capturing, and outputs data of the resulting audio after digitalization thereof. The audio encoding section 19 subjects the audio data coming from the audio input section 18 to audio compression by AC3 and Dolby Digital, for example, and outputs the resulting encoded audio data. The data generation section 1A multiplexes both the encoded image data and the encoded audio data, and outputs stream data. The data recording section 1B records the stream data onto a recording medium that will be described later. The recording medium 1C is exemplified by a DVD (Digital Versatile Disc), a Blu-ray, a hard disk, a semiconductor memory, and others. The video camera 1 is connected to the navigation system 2 through an AV (Audio Visual) cable 3. The navigation system 2 is configured to include a navigation body section 21 and a navigation display section 22, and the navigation body section 21 includes a navigation image output section 211 that outputs navigation video. The navigation image output section 211 keeps outputting video signals to the navigation display section 22, and outputs signals also to the AV cable 3 connected to an external video terminal (not shown), and others.

Figure 2:
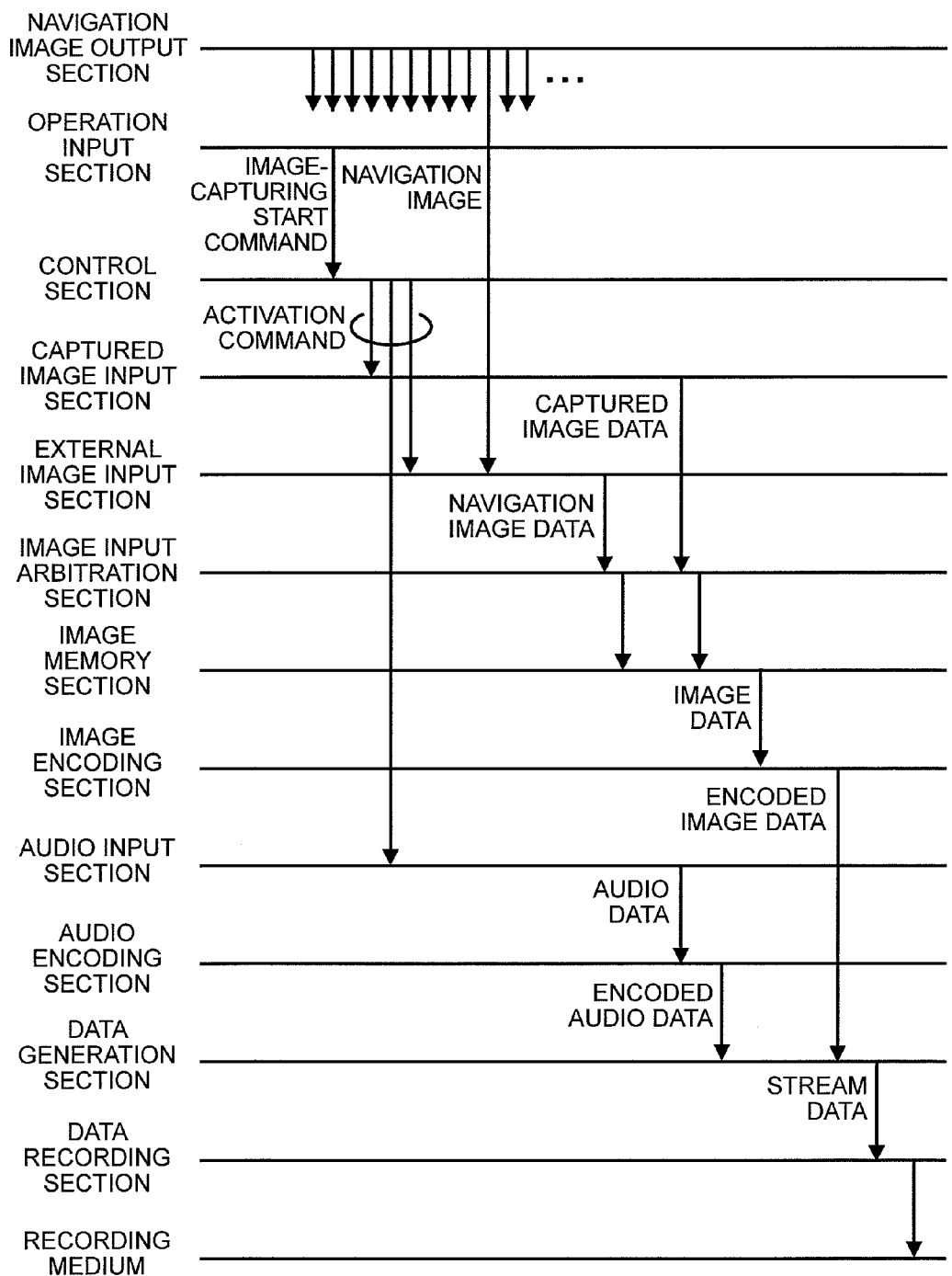
FIG. 2 is a flow diagram of the image recording/reproducing system of the first embodiment.

FIG. 2 shows the operation flow of the components in the first embodiment.

Figure 3:
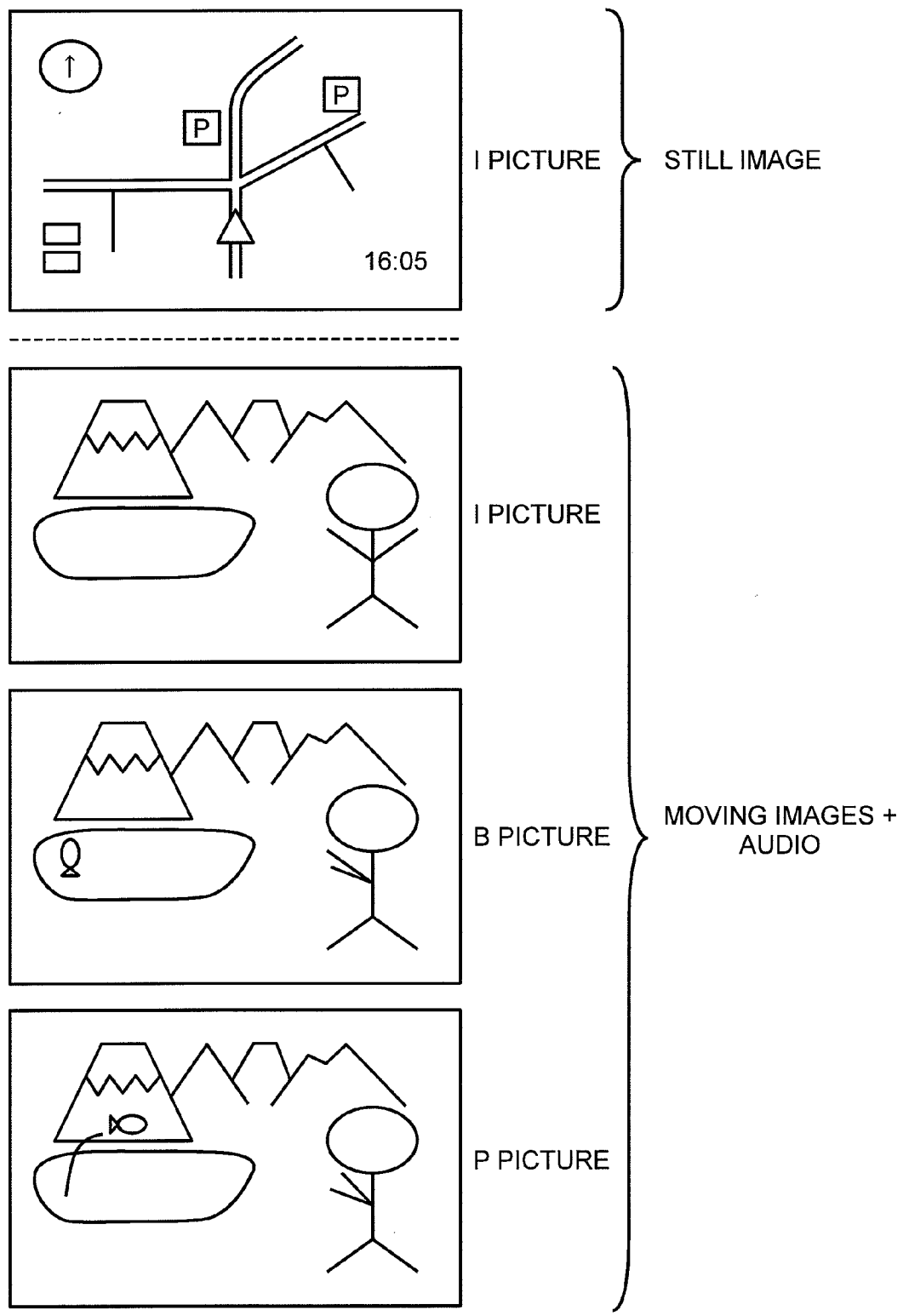
FIG. 3 is a schematic diagram of stream data generated in the image recording/reproducing system of the first embodiment.

Described next is the procedure of image capturing in the image recording/reproducing system of the first embodiment. A user issues an image-capturing command to the operation input section 11 using the buttons and switches provided to the video camera 1. The operation input section 11 then issues an image-capturing start command to the control section 12. In response, the control section 12 issues an activation command all to the captured image input section 13, the audio input section 18, and the external image input section 14. In response to the activation command, the external image input section 14 captures, through the AV cable 3, the video signals that are always coming from the external video terminal of the navigation system 2 and others, and generates navigation image data for output to the image input arbitration section 15. The captured image input section 13 receives a target image of user's image capturing, and generates captured image data by digitalizing the target image. The resulting data is forwarded to the image input arbitration section 15. The audio input section 18 receives any target audio of the user's image capturing, and generates audio data by digitalizing the target audio. The resulting data is forwarded to the audio encoding section 19. The data provided to the image input arbitration section 15 as such, i.e., the navigation image data and the captured image data, are temporarily stored each in an area of the image memory section 16 in this order for encoding. That is, the navigation image data is temporarily stored in an area of the image memory section 16 from which the first image data is read for processing by the image encoding section 17 disposed at the subsequent stage, and the captured image data is temporarily stored in another area of the image memory section 16 from which the second image data and others thereafter are read for processing thereby. The data temporarily stored in the image memory section 16 as such, i.e., the navigation image data and the captured image data, are read in this order as image data by the image encoding section 17. The image encoding section 17 subjects the image data to image compression and encoding. Herein, the image encoding section 17 applies image compression and encoding to the navigation image data, i.e., the first image, only by data of a screen, e.g., applies compression and encoding as an I picture of H.264. Similarly to the first screen image of the captured image data, the captured image data subsequent to the navigation image data is subjected to compression and encoding also as an I picture. The images subsequent thereto are subjected to compression and encoding as P or B pictures with an estimation from other images located forward and rear thereof, as I pictures only with data of a screen, or as mixture data thereof, thereby generating the encoded image data. The resulting encoded image data is forwarded to the data generation section 1A. For the purpose of performing such a process of compression and encoding more in real time, the image encoding section 17 performs the process with the lower quantization level for reducing the load of the process, e.g., reducing the amount of encoding, or changes the processing speed by temporarily increasing the clock frequency, for example. On the other hand, the audio data provided to the audio encoding section 19 is subjected to compression and encoding by the audio encoding section 19, thereby generating encoded audio data. The resulting encoded audio data is also forwarded to the data generation section 1A. The data generation section 1A multiplexes the encoded image data and the encoded audio data, and generates stream data of moving images. FIG. 3 shows the schematic diagram of (exemplary) stream data. FIG. 3 shows the stream data in order, from the top, of images subjected to a process of decoding and decompression. The first image indicates the navigation screen, which has been compressed and encoded as an I picture and multiplexed to include no audio data. The images located at the second, third, and fourth each indicate the captured image data, and the second image has been compressed and encoded as an I picture, the third image as a B picture, and the fourth image as a P picture. The audio data is multiplexed using the encoded audio data. The stream data generated by the data generation section 1A is forwarded to the data recording section 1B, and the data recording section 1B records the stream data onto the recording medium 1C.

For reproducing the stream data recorded as such using the video camera 1, a picture analysis section (not shown) is provided for analyzing the picture type of the stream data. If the analysis result tells that the stream data includes two or more I pictures in a row, the first I picture is forwarded to the display section (not shown) of the video camera 1, and the display section keeps displaying the same image for a preset length of time. Thereafter, the next I picture is forwarded to the display section. When the next picture is not of I, the pictures are forwarded to the display section one after another as with general reproduction of video data. As an alternative to such image display, i.e., when the stream data includes two or more I pictures in a row, the first I picture is forwarded to the display section (not shown) of the video camera 1, and the image remains displayed for a preset length of time, any same image may remain displayed until any user's operation, e.g., a user pushes a reproduction button or others, and in response thereto, the next image may be displayed.

For reproducing the stream data in devices other than the video camera 1, with a moving-image compression/encoding method with a mechanism for embedding, in a stream, data for stopping stream reproduction, e.g., a Still command of DVD-video standard, a VOBU (Video Object Unit) may be allocated between the pictures of the navigation screen and the pictures of the captured image of the second screen and others thereafter, and a VOBU Still command may be inserted by the data generation section 1A.

As such, in addition to section for receiving general captured images, the video camera is provided with section for receiving images from any other video input source. The video camera may be also provided with an image input arbitration section that captures, after arbitration, video data coming from these two input section, and stores the captured result into a memory. When the video input source is a video output terminal of a car navigation system, the screen of the car navigation system, i.e., map information, can be captured into a memory together with a user-captured image. The data in the memory is subjected to a process of compression and encoding as moving images, thereby leading to the effects of being able to process the map information and the user-captured image as a set of moving images.

Exemplified in this embodiment is the configuration that the navigation system 2 is connected to the outside of the video camera 1. This is surely not restrictive, and the similar effects can be also achieved even if the video camera 1 and the navigation system 2 are configured as a piece.

Figure 8:
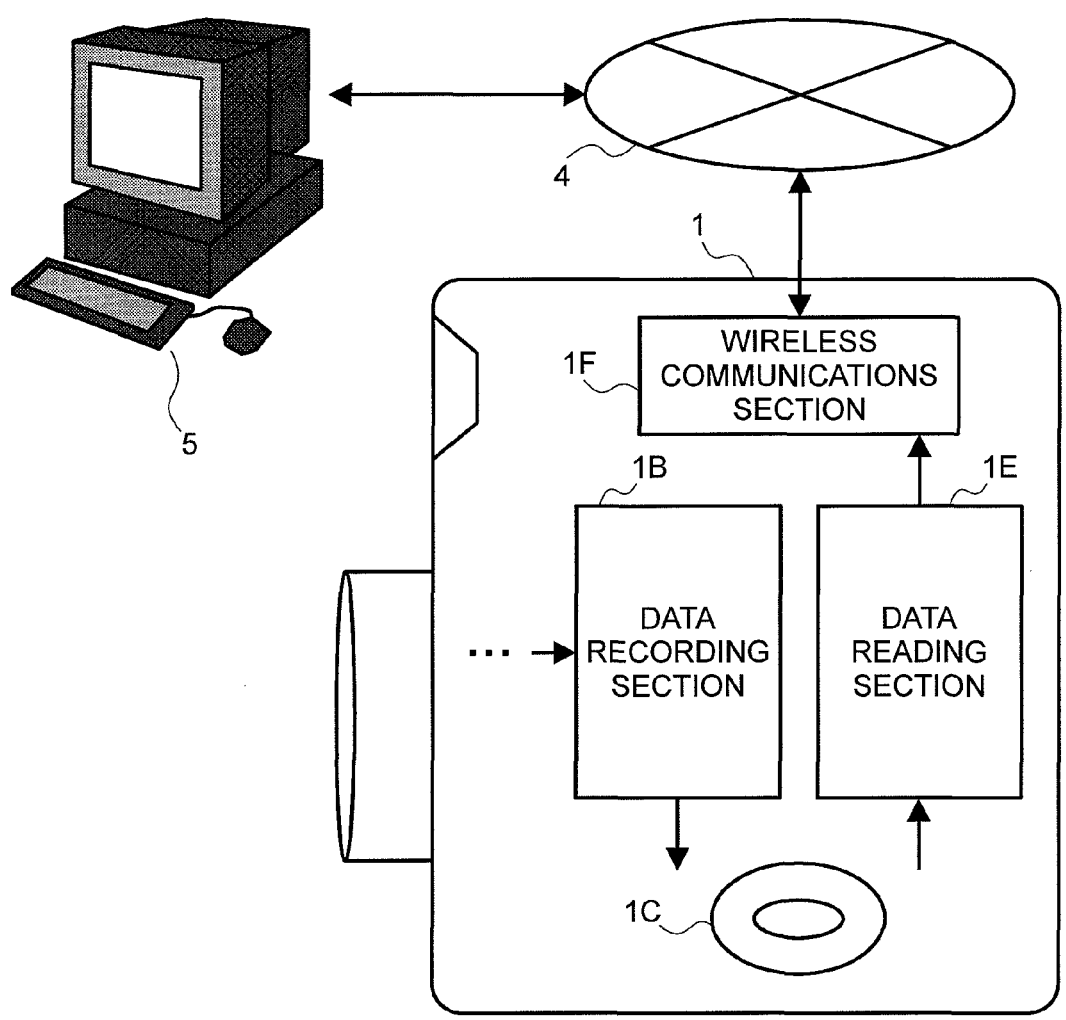
FIG. 8 is a schematic diagram of a system for transferring stream data at a hotspot.

The stream data recorded on the recording medium 1C may be automatically transferred to a network server, for example, via wireless LAN environments, e.g., hotspots, that are found at many places in town. FIG. 8 is a schematic diagram of a system that transfers the stream data to the server in the hotpot environments. The video camera 1 is configured to include a data reading section 1E and a wireless communications section 1F. The data reading section 1E serves to read the stream data from the recording medium 1C, and the wireless communications section 1F serves to wirelessly transmit the stream data to a network 4. The stream data output from the wireless communications section 1F is transferred to a server 5 connected to the network 4.

Figure 9:
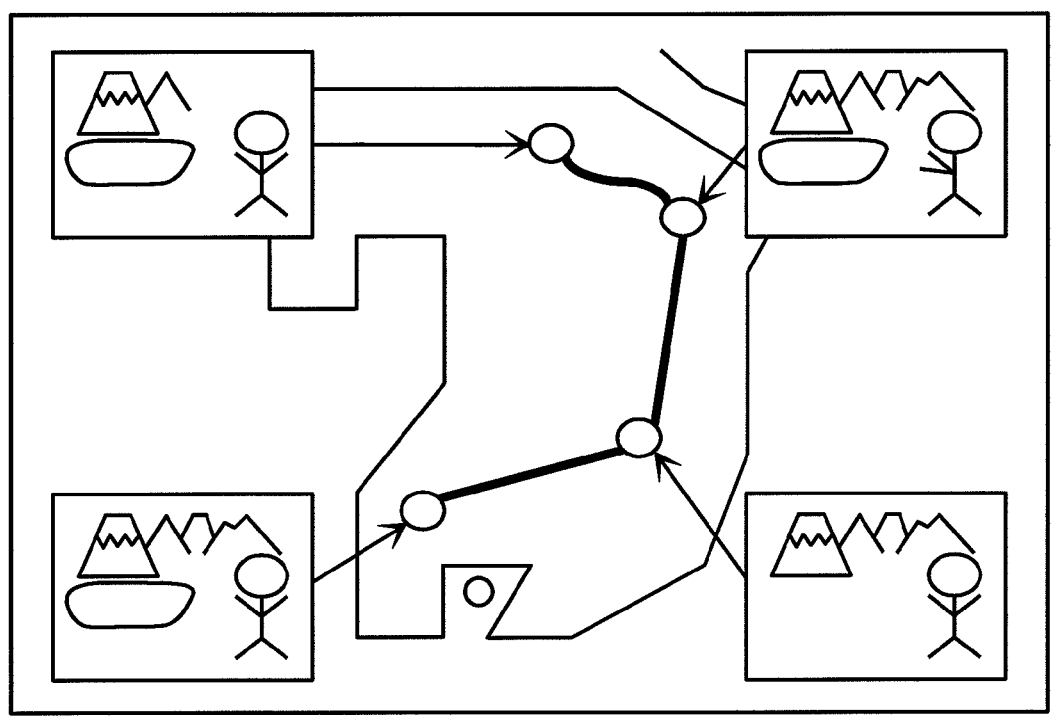
FIG. 9 shows an exemplary thumbnail display.

In this embodiment, the data generation section 1A is described as simply generating stream data. Alternatively, the data generation section 1A may receive current position information from the navigation system 2 separately from the navigation image data, generate stream data with a correlation with the current position information, and output the resulting stream data to the data recording section 1B for recording onto the recording medium 1C. If this is the case, for generating a thumbnail image of the stream data recorded on the recording medium 1C, the current position information may be used as a basis to configure the thumbnail display image with a combination with the map screen as shown in FIG. 9. In FIG. 9 example, the position on the map corresponding to the position information correlated to the stream data is indicated by a circle, and the first captured image of the stream data is indicated with a correlation with the circle. When the video camera 1 includes a plurality of recording media, e.g., a hard disk and a DVD, the hard disk may be used for recording of data when the video camera 1 is in general use, and the DVD may be used for recording of such a title screen as FIG. 9. The title screen is automatically created for use by a user to select and edit the stream data for recording onto a DVD, for example.

In the embodiment, the image-capturing command is described as being issued by the operation input section 11 through user's operation of buttons and switches of the video camera 1. Alternatively, the navigation system 2 and the video camera 1 may be each provided with communications section such as USB, Bluetooth, and wireless LAN. A user may make a setting in advance to the navigation system 2 of any preferred location for image capturing, and when the user reaches the location set as such, the navigation system 2 may forward an image-capturing command to the operation input section 11 of the video camera 1. The operation input section 11 then forwards an image-capturing start command to the control section 12 so that the image capturing may be started in response thereto.

The effects similar thereto can be also achieved by video cameras disposed at a plurality of locations for monitoring use under the following three requirements. That is, firstly, the navigation system 2 and the AV cable 3 are replaced with a medium storing map image data in advance, e.g., USB flash memory and SD card, and a reading device that reads the map image data from the medium. Secondly, data transfer to the network server is performed under the hotpot environments as shown in FIG. 8. Thirdly, send-out section is provided for reading compressed image data recorded on a recording medium, and assembling the compressed image data into packets at a predetermined timing set by a user for sending out to the network. In this case, the wireless communications section 1F may be replaced with the communications function by wired LAN.

Second Embodiment

Figure 4:
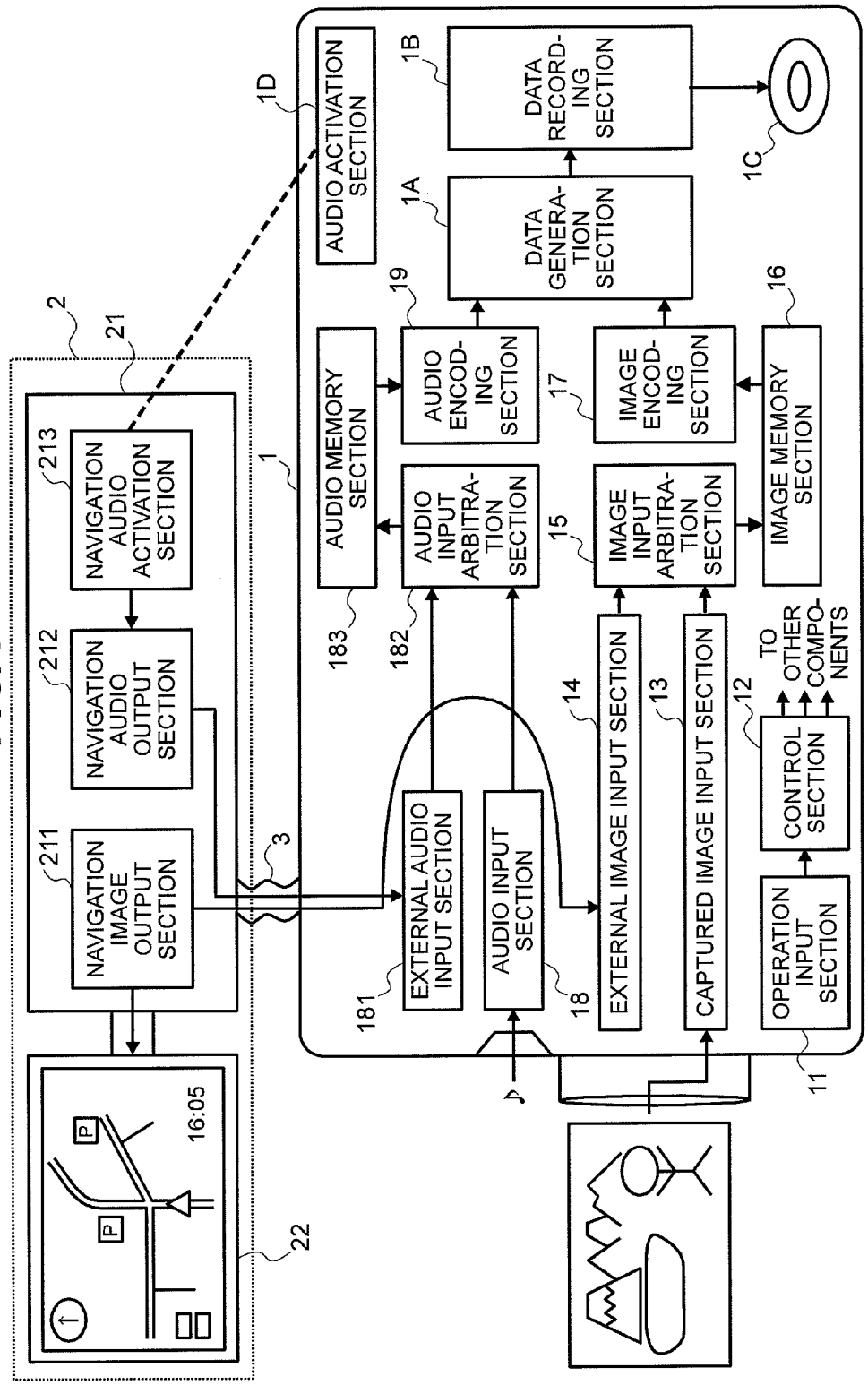
FIG. 4 is a diagram showing the configuration of an image recording/reproducing system of a second embodiment.

A second embodiment is described next. FIG. 4 shows an image recording/reproducing system of a second embodiment of the invention. In this embodiment, the configuration difference from the first embodiment lies in the following components provided to the video camera 1 in addition to the configuration of FIG. 1, i.e., an external audio input section 181, an audio input arbitration section 182, an audio memory section 183, and an audio activation section 1D. The external audio input section 181 serves to receive audio from the navigation system 2. The audio input arbitration section 182 arbitrates the order of audio data coming from the audio input section 18 and navigation audio data coming from the external audio input section 181, and outputs the resulting data. The audio memory section 183 temporarily stores the data provided by the audio input arbitration section 182, and the audio activation section 1D serves to transmit, to the navigation system 2 by infrared communications or others, an audio activation command for the navigation system 2 to activate the audio. The configuration difference also lies in the following components provided to the navigation body section 21 of the navigation system 2 in addition to the configuration of FIG. 1, i.e., a navigation audio activation section 213 and a navigation audio output section 212. The navigation audio activation section 213 receives an audio activation command from the audio activation section 1D of the video camera 1 by infrared communications or others, and issues an activation command for outputting navigation audio. The navigation audio output section 212 outputs the navigation audio in response to the activation command.

Figure 5:
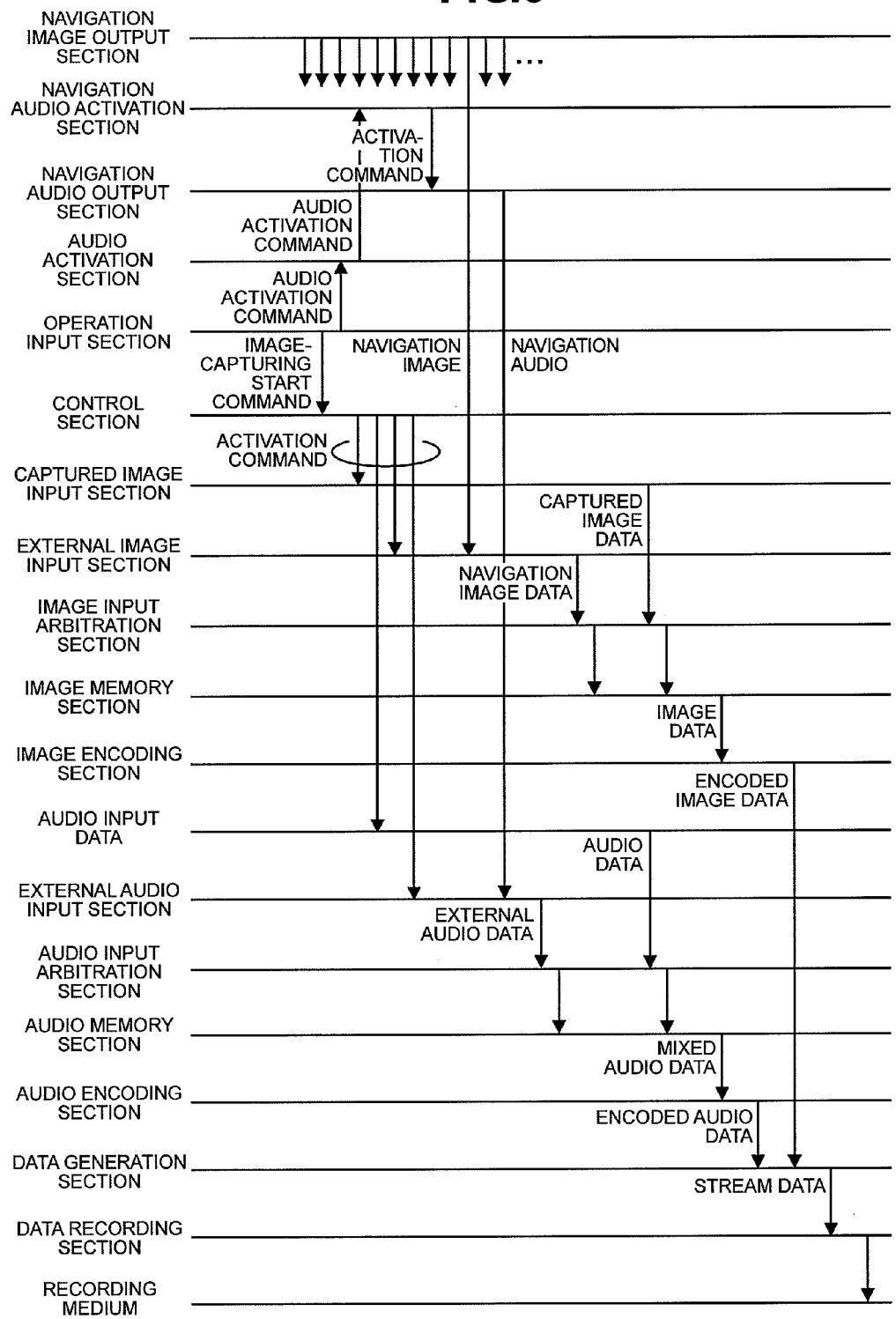
FIG. 5 is a flow diagram of the image recording/reproducing system of the second embodiment.

FIG. 5 shows the operation flow of the components in the second embodiment.

Figure 6:
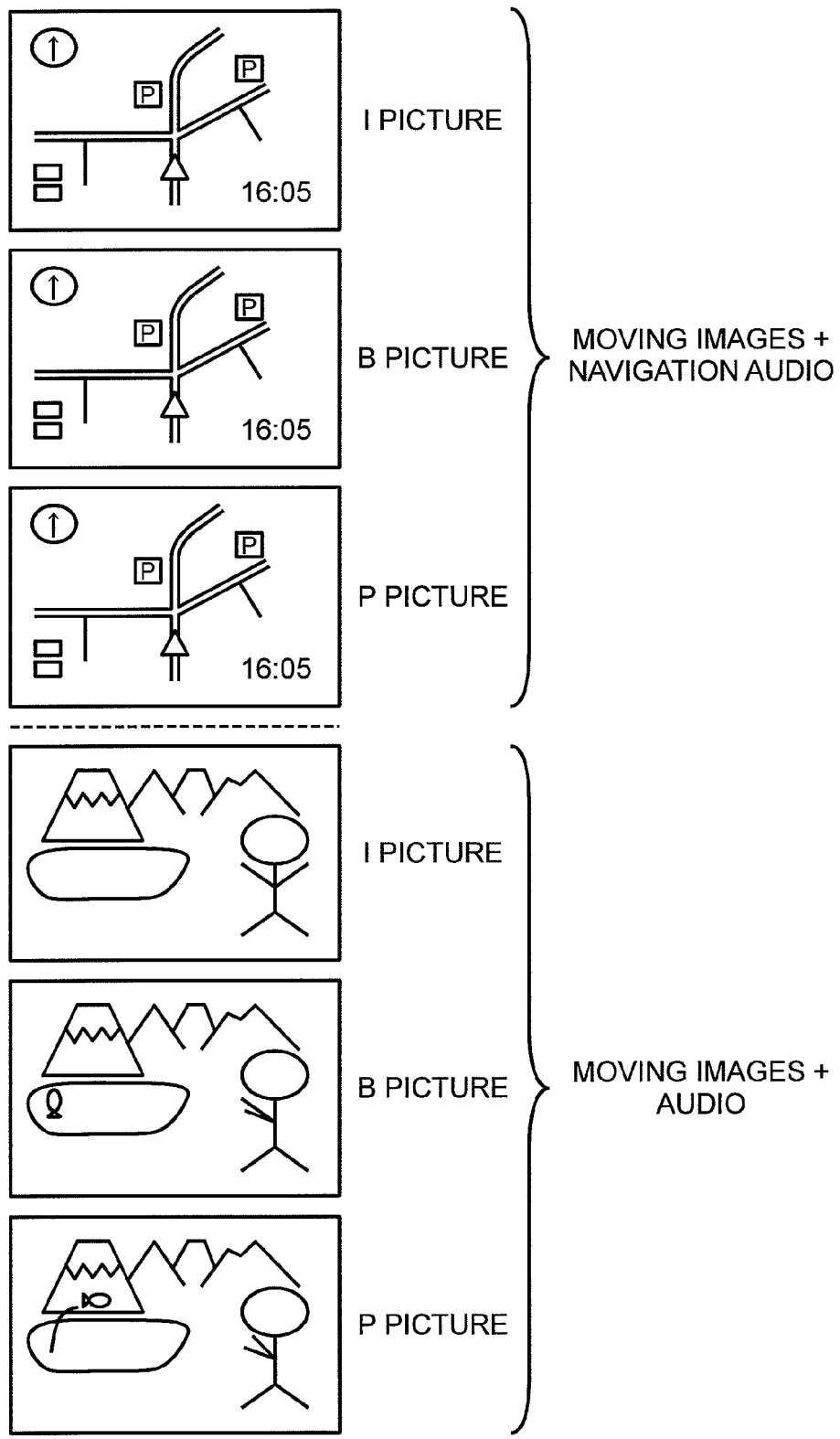
FIG. 6 is a schematic diagram of stream data generated in the image recording/reproducing system of the second embodiment.
Figure 7:
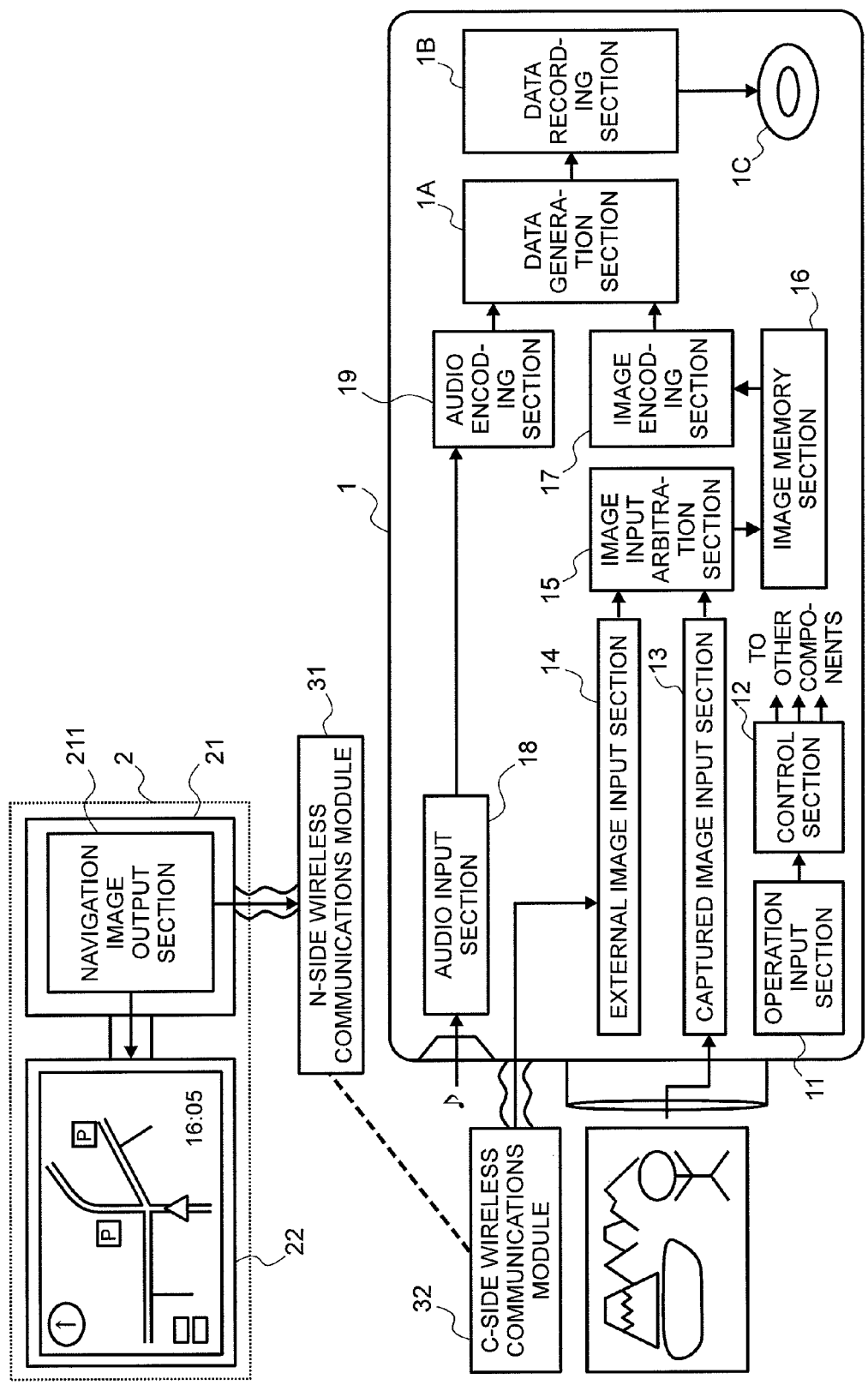
FIG. 7 is a diagram showing the configuration of an image recording/reproducing system of a third embodiment.

Described now is the image-capturing procedure in the image recording/reproducing system of the second embodiment. A user issues an image-capturing command to the operation input section 11 of the video camera 1. This image-capturing command may be an operation for the navigation system 2 to activate audio telling position information and others, e.g., an operation of pushing the "current location" button of the navigation system 2. The operation input section 11 issues an image-capturing start command to the control section 12. The operation input section 11 also issues an audio activation command to the audio activation section 1D. The control section 12 issues an activation command all to the captured image input section 13, the audio input section 18, the external image input section 14, and the external audio input section 181. In response to the activation command, the external image input section 14 captures, from the navigation system 2, video signals that are always coming from the external video terminal, for example, and generates navigation image data for output to the image input arbitration section 15. The navigation image data in this case is data with one or more pictures of a fixed length of time set by a user in advance. The captured image input section 13 inputs a target image of user's image capturing, and generates captured image data by digitalization of the target image. The generated data is forwarded to the image input arbitration section 15. On the other hand, in response to the audio activation command issued against the audio activation section 1D by the operation input section 11, the audio activation section 1D issues, by infrared communications or others, an audio activation command to the navigation audio activation section 213 of the navigation system 2. This audio activation command may be issued by the audio activation section 1D, and may be the same as a signal provided to the navigation system 2 from a remote controller when a "current location" button or others provided thereto are pushed. The remote controller here is the one provided to the navigation system 2 as the general function of navigation. When receiving the audio activation command, the navigation audio activation section 213 issues an activation command to the navigation audio output section 212. In response to the activation command, the navigation audio output section 212 may output an audio such as "the current location is close to Yoshida-cho, Totsuka, Yokohama", and this audio is output from the external audio terminal, for example. The external audio input section 181 captures, from the navigation system 2, the navigation audio coming from the external audio terminal and others in response to the activation command from the control section 12, and generates navigation audio data for output to the audio input arbitration section 182. The navigation audio data in this case is data of a fixed length of time set by a user in advance. The time set as such may be the same as the time for data capturing by the external image input section 14. The audio input section 18 receives any target audio of user's image capturing, and generates audio data by digitalization thereof. The resulting audio data is forwarded to the audio encoding section 19. The navigation image data and the captured image data provided to the image input arbitrary section 15 are temporarily stored in an area of the image memory section 16, which is set for encoding in this order. That is, the navigation image data is temporarily stored in an area of the image memory section 16 from which the first image data is read for processing by the image encoding section 17 disposed at the subsequent stage, and the captured image data is temporarily stored in another area of the image memory section 16 from which the second image data and others thereafter are read for processing thereby. The data temporarily stored in the image memory section 16 as such, i.e., the navigation image data and the captured image data, are read in this order as image data by the image encoding section 17. The image encoding section 17 subjects the image data to image compression and encoding. Herein, the image encoding section 17 applies image compression and encoding to the navigation image data, i.e., the first image, only by data of a screen, e.g., applies compression and encoding as an I picture of H.264. Similarly to the first screen image of the captured image data, the captured image data subsequent to the navigation image data is subjected to compression and encoding as an I picture. The images subsequent thereto are subjected to compression and encoding as P or B pictures with an estimation from other images located forward and rear thereof, as I pictures only with data of a screen, or as mixture data thereof, thereby generating the encoded image data. The resulting encoded image data is forwarded to the data generation section 1A. On the other hand, the navigation audio data and the audio data provided to the audio input arbitration section 182 are temporarily stored in an area of the audio memory section 183, which is set for encoding in this order. The navigation audio data and the audio data temporarily stored as such in the audio memory section 183 are read in this order by the audio encoding section 19 as mixed audio data. The mixed audio data thus provided to the audio encoding section 19 is subjected to a process of compression and encoding by the audio encoding section 19 so that the encoded audio data is generated. The resulting encoded audio data is forwarded to the data generation section 1A. The data generation section 1A multiplexes the encoded image data and the encoded audio data, and generates stream data of moving images. FIG. 6 shows the schematic diagram of (exemplary) stream data. FIG. 6 shows the stream data in order, from the top, of images subjected to a process of decoding and decompression. The upper three images indicate the navigation screens, which have been compressed and encoded as pictures of I, B, and P from the top, and the audio data is multiplexed by data corresponding to the external audio data of the encoded audio data. The lower three images indicate the captured image data, which have been compressed and encoded as pictures of I, B, and P from the fourth image from the top, and the audio data is multiplexed by data corresponding to the audio data of the encoded audio data. In FIG. 6, the upper three images are of the same but may be all different navigation images. The stream data generated by the data generation section 1A is forwarded to the data recording section 1B, and the data recording section 1B records the stream data onto the recording medium 1C.

In such a procedure, the effects similar to the first embodiment can be achieved.

In this embodiment, the navigation image data is described as being data of a fixed length of time set by a user in advance, for example. Alternatively, the navigation system 2 and the video camera 1 may be each provided with communications section such as USB, Bluetooth, and wireless LAN, and when the navigation audio is completed, the navigation system 2 may forward a navigation audio completion notice to the external audio input section 181 of the video camera 1, and the external audio input section 181 may determine the end of the data by the completion notice.

Third Embodiment

A third embodiment is described next. The difference from the first embodiment lies in that the video camera 1 is connected with C-side wireless communications section 32, and the navigation system 2 is connected with N-side wireless communications section 31, i.e., in the first embodiment, the video camera 1 and the navigation system 2 are connected together by the AV cable 3. The C-side wireless communications section 32 and the N-side wireless communications section 31 communicate each other for data exchange using a wireless communications protocol such as infrared communications, wireless LAN, and Bluetooth.

The image-capturing procedure in the image recording/reproducing system of the third embodiment is similar to the first embodiment except that a navigation image is exchanged by the N- and C-side wireless communications section 31 and 32, i.e., in the first embodiment, a navigation image is exchanged between the navigation image output section 211 to the external image input section 14 via an AV cable 3.

With such a procedure, the effects similar to the first embodiment can be achieved.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A module which compresses and encodes a plurality of images for recording onto a recording medium, or an image recording apparatus or an image recording system including the module, comprising:
   at least two first and second types of an image input module which captures an image of one or more frames from a video signal source, and converts the image into digital image data for output;
   an image input arbitration module which arbitrates an order of the digital image data provided by the at least two first and second types of the image input module to ensure that the digital image data provided by the first type is placed before the digital image data provided by the second type, wherein
   the first type of the image input module is provided with a real-time image,
   the image recording apparatus or the image recording system further comprises:
   a memory module which temporarily stores the real-time image by a processing time for the image input arbitration module to process the digital image data provided by the second type of the image input module
   an image encoding module which compresses and encodes the digital image data, and
   the image encoding module changes a processing speed to perform a process of compression and encoding more in real time.

2. The image recording apparatus or the image recording system according to claim 1, wherein
   the first type of the image input module captures an image captured by a user, and the second type of the image input module captures an image coming from a navigation system or a module which outputs a map image,
   the image input arbitration module arbitrates an order of image data to ensure that the image provided by the second type of the image input module which captures the image coming from the navigation system or the module outputting the map image is placed at a first frame, and the image provided by the first type of the image input module which captures the user-captured image is placed at a second frame or others thereafter, and
   the image encoding module compresses and encodes the first and second frames of the image data using only information in a screen, and compresses and encodes a third frame and others thereafter using information in the screen or information in any other screen.

3. The image recording apparatus or the image recording system according to claim 2, wherein
   between the data of the image provided by the second type of the image input module which captures the image coming from the navigation system or the module outputting the map image and the data of the image provided by the first type of the image input module which captures the user-captured image, the image encoding module inserts command data for a temporary halt during reproduction.

4. The image recording apparatus or the image recording system according to claim 1, comprising
   a wireless communications module which makes a detection of entering in an Internet-accessible area by wireless communications, issues a command to the data reading section to read the recorded image data, receives the recorded image data from the data reading section, and uploads the image data to a server on the Internet by wireless communications.

5. The image recording apparatus or the image recording system according to claim 1, comprising
   a data generation module which multiplexes the compressed/encoded data provided by each of the image encoding module and the audio encoding module, wherein
   the data generation module generates data, for recording onto the recording medium, by correlating the multiplexed data with position-related data provided by a system including a navigation system or a module which outputs a map image, and a module which outputs a position-related audio.

6. The image recording apparatus or the image recording system according to claim 1, wherein
   the image input module starts to operate in response to an operation made by the user for starting image capturing.

7. The image recording apparatus or the image recording system according to claim 1, wherein
   the image input module starts to operate in navigation system or a system including a module which outputs a map image and a module which outputs a position-related audio, in response to an operation start command.

8. A module which compresses and encodes a plurality of images for recording onto a recording medium, or an image recording apparatus or an image recording system including the module, comprising:
   at least two first and second types of an image input module which captures an image of one or more frames from a video signal source, and converts the image into digital image data for output;
   an image input arbitration module which arbitrates an order of the digital image data provided by the at least two first and second types of the image input module to ensure that the digital image data provided by the first type is placed before the digital image data provided by the second type, wherein
   the second type of the image input module is provided with a real-time image,
   the image recording apparatus or the image recording system further comprises:
   a memory module which temporarily stores the real-time image by a processing time for the image input arbitration module to process the digital image data provided by the second type of the image input module;
   an image encoding module which compresses and encodes the digital image data; and a send-out module which reads compressed image data recorded on the recording medium, and assembles the compressed image data into a packet at a predetermined timing set by a user for sending out to a network.

9. A module which compresses and encodes a plurality of images for recording onto a recording medium, or an image recording apparatus or an image recording system including the module, comprising:

at least two first and second types of an image input module which captures an image of one or more frames from a video signal source, and converts the image into digital image data for output an image input arbitration module which arbitrates an order of the digital image data provided by the at least two first and second types of the image input module to ensure that the digital image data provided by the first type is placed before the digital image data provided by the second type, wherein the second type of the image input module is provided with a real-time image, the image input arbitration module does not process the real-time image by a processing time for the image input arbitration module to process the digital image data provided by the second type of the image input module, and the image recording apparatus or the image recording system further comprises an image encoding module which compresses and encodes the digital image data.

10. The image recording apparatus or the image recording system according to claim 9, wherein the second type of the image input module captures an image coming from a navigation system or a module which outputs a map image, and the first type of the image input module captures an image captured by a user, the image input arbitration module arbitrates an order of image data to ensure that the image provided by the second type of the image input module which captures the image coming from the navigation system or the module outputting the map image is placed at a first frame, and the image provided by the first type of the image input module which captures the user-captured image is placed at a second frame or others thereafter, and without capturing the image provided by the second type of the image input module which captures the user-captured image for a duration of a time of processing the image provided by the second type of the image input module which captures the image coming from the navigation system or the module outputting the map image, starts capturing of the image provided by the first type of the image input module which captures the user-captured image after the processing is completed for the image provided by the second type of the image input module which captures the image coming from the navigation system or the module outputting the map image, and the image encoding module compresses and encodes the first and second frames of the image data using only information in a screen, and compresses and encodes a third frame and others thereafter using information in the screen or information in any other screen.

11. A module which compresses and encodes a plurality of images for recording onto a recording medium, or an image recording apparatus or an image recording system including the module, comprising:

at least two first and second types of an image input module which captures an image of one or more frames from a video signal source, and converts the image into digital image data for output;

an image input arbitration module which arbitrates an order of the digital image data provided by the at least two first and second types of the image input module to ensure that the digital image data provided by the second type is placed before the digital image data provided by the first type;

at least two first and second types of an audio input module which captures an audio from an audio signal source, and converts the audio into digital audio data for output;

an audio input arbitration module which arbitrates an order of the digital audio data provided by the at least two first and second types of the audio input module to ensure that the digital audio data provided by the second type is placed before the digital audio data of the first type, wherein the second type of the image input module is provided with a real-time image, the image recording apparatus or the image recording system further comprises:

a memory module which temporarily stores the real-time image by a processing time for the image input arbitration module to process the digital image data provided by the first type of the image input module;

an image encoding module which compresses and encodes the digital image data, the image encoding module changes a processing speed to perform a process of compression and encoding more in real time, the second type of the audio input module is provided with a real-time audio, the image recording apparatus or the image recording system further comprises:

a memory module which temporarily stores the real-time audio by a processing time for the audio input arbitration module to process the digital audio data provided by the first type of the audio input module;

an audio encoding module which compresses and encodes the digital audio data, and the audio encoding module changes a processing speed to perform a process of compression and encoding more in real time.

12. The image recording apparatus or the image recording system according to claim 11, wherein the second type of the image input module captures an image coming from a navigation system or a module which outputs a map image by a fixed length of time set by a user in advance, and the first type of the image input module captures an image captured by the user, the image input arbitration module arbitrates the digital image data provided by the at least two first and second types of the image input module, and arbitrates an order of the digital image data to ensure that the digital image data provided by the second type of the image input module which captures the image coming from the navigation system or the module outputting the map image is placed in a first frame of the fixed length of time, and the digital image data of the first type of the image input module which captures the user-captured image is placed in a frame subsequent to the frame of the fixed length of time or others thereafter, the image recording apparatus or the image recording system further comprises an image memory module which buffers the digital image data of the first type of the image input module which captures the user-captured image for a duration of a time of processing the digital image data of the second type of the image input module which captures the image coming from the navigation system or the module outputting the map image, the second type of the audio input module captures an audio coming from the navigation system or a module which outputs a position-related audio by a fixed length of time set by the user in advance, and the first type of the audio input module captures an audio being a recording target of the user, the audio input arbitration module arbitrates the digital audio data provided by the at least two first and second types of the audio input module, and arbitrates an order of the digital audio data to ensure that the digital audio data provided by the second type of the audio input module which captures the audio coming from the navigation system or the module outputting the position-related audio is placed to first audio data of the fixed length of time, and the audio provided by the first type of the audio input module which captures the audio of the user's recording target is placed after the audio data of the fixed length of time, the image recording apparatus or the image recording system further comprises:

an audio memory module which buffers the digital audio data of the first type of the audio input module which captures the audio of the user's recording target for a duration of a time of processing the digital audio data provided by the second type of the audio input module which captures the audio coming from the navigation system or the module outputting the position-related audio; and an audio activation module which outputs a signal serving as a cue for audio output by the navigation system or the module outputting the position-related audio.

13. The image recording apparatus or the image recording system according to claim 12, comprising:

a module which receives image and audio completion notification data from the navigation system or the system including the module outputting the map image and the module outputting the position-related audio, and outputs a completion notice to the image input arbitration section and the audio input arbitration section, the second type of the image input module keeps capturing the image coming from the navigation system or the module outputting the map image until the completion notice comes, and the first type of the image input module captures the user-captured image, the image input arbitration module arbitrates the digital data provided by the at least two first and second types of the image input module, and arbitrates an order of the digital image data to ensure that the image of the second type of the image input module which captures the image coming from the navigation system or the module outputting the map image is placed in a first frame up to a time when the completion notice comes, and the image of the first type of the image input module which captures the user-captured image is placed in a frame subsequent to the frame up to the time when the completion notice comes or others thereafter, the second type of the audio input module keeps capturing the audio coming from the navigation system or the module outputting the position-related audio until the completion notice comes, and the first type of the audio input module captures the audio of the user's recording target, the audio input arbitration module arbitrates the digital data provided by the at least two first and second types of the audio input module, and arbitrates an order of the audio data to ensure that the digital audio data provided by the second type of the audio input module which captures the audio coming from the navigation system or the module outputting the position-related audio is placed to first audio data up to a time when the completion notice comes, and the audio provided by the first type of the audio input module which captures the audio of the user's recording target is placed subsequent to the digital audio data up to the time when the completion notice comes, and the image recording apparatus or the image recording system further comprises an audio activation module which outputs a signal serving as a cue for audio output by the navigation system or the module outputting the position-related audio.

14. A module which compresses and encodes a plurality of images for recording onto a recording medium, or an image recording apparatus or an image recording system including the module, comprising:

at least two first and second types of an image input module which captures an image of one or more frames from a video signal source, and converts the image into digital image data for output;

an image input arbitration module which arbitrates an order of the digital image data provided by the at least two first and second types of the image input module to ensure that the digital image data provided by the second type is placed before the digital image data provided by the first type;

at least two first and second types of an audio input module which captures an audio from an audio signal source, and converts the audio into digital audio data for output;

an audio input arbitration module which arbitrates an order of the digital audio data provided by the at least two first and second types of the image input module to ensure that the digital audio data provided by the second type is placed before the digital audio data of the first type, wherein the second type of the image input module is provided with a real-time image, the image input arbitration module does not process the real-time image by a processing time for the image input arbitration module to process the digital image data provided by the first type of the image input module, the image recording apparatus or the image recording system further comprises an image encoding module which compresses and encodes the digital image data, the second type of the audio input module is provided with a real-time audio, the audio input arbitration module does not process the real-time audio by a processing time for the audio input arbitration module to process the digital audio data provided by the first type of the audio input module, and the image recording apparatus or the image recording system further comprises an audio encoding module which compresses and encodes the digital audio data.

15. The image recording apparatus or the image recording system according to claim 14, wherein the second type of the image input module captures an image coming from a navigation system or a module which outputs a map image by a fixed length of time set by a user in advance, and the first type of the image input module captures an image captured by a user, the image input arbitration module arbitrates the digital image data provided by the at least two first and second types of the image input module, arbitrates an order of image data to ensure that an image provided by the second type of the image input module which outputs an image coming from a navigation system or a module which outputs the map image is placed in a first frame of the fixed length of time, and an image provided by the first type of the image input module which captures an image captured by the user is placed in a frame subsequent to the frame of the fixed length of time or others thereafter, and without capturing the image provided by the first type of the image input module which captures the user-captured image for a duration of a time of processing the image provided by the second type of the image input module which captures the image coming from the navigation system or the module outputting the map image, starts capturing of the image provided by the first type of the image input module which captures the user-captured image after the processing is completed for the image provided by the second type of the image input module which captures the image coming from the navigation system or the module outputting the map image, the second type of the audio input module captures an audio coming from a navigation system or a module which outputs a position-related audio by a fixed length of time set by the user in advance, and the first type of the audio input module captures an audio being a recording target of the user, the audio input arbitration module arbitrates the digital audio data provided by the at least two first and second types of the audio input module, arbitrates an order of the digital audio data to ensure that the audio data provided by the second type of the audio input module which captures the audio coming from the navigation system or the module outputting the position-related audio is placed to first audio data of the fixed length of time, and the audio provided by the first type of the audio input module which captures the audio of the user's recording target is placed after the audio data of the fixed length of time, and without capturing the digital audio data provided by the first type of the audio input module which captures the audio of the user's recording target for a duration of a time of processing the digital audio data provided by the second type of the audio input module which captures the audio coming from the navigation system or the module outputting the position-related audio, starts capturing of the digital audio data provided by the first type of the audio input module which captures the audio of the user's recording target after the processing is completed for the digital audio data provided by the second type of the audio input module which captures the audio coming from the navigation system or the module outputting the position-related audio, and the image recording apparatus or the image recording system further comprises an audio activation module which outputs a signal serving as a cue for audio output by the navigation system or the module outputting the position-related audio.

16. An image recording method of compressing and encoding a plurality of images for recording onto a recording medium in an image recording apparatus or an image recording system, the image recording method comprising:
capturing, via at least two first and second types of an image input module, an image of one or more frames from a video signal source, and converting the image into digital image data for output;
arbitrating, via an image input arbitration module, an order of the digital image data provided by the at least two first and second types of the image input module to ensure that the digital image data provided by the second type is placed before the digital image data provided by the first type, wherein
the second type of the image input module is provided with a real-time image,
temporarily storing, via a memory module, the real-time image by a processing time for the image input arbitration module to process the digital image data provided by the first type of the image input module;
compressing and encoding, via an image encoding module, the digital image data, and
changing, via the image encoding module, a processing speed to perform a process of compression and encoding more in real time.

17. An image recording method of compressing and encoding a plurality of images for recording onto a recording medium in an image recording apparatus or an image recording system, the image recording method comprising:
capturing, via at least two first and second types of an image input module, an image of one or more frames from a video signal source, and converting the image into digital image data for output;
arbitrating, via an image input arbitration module, an order of the digital image data provided by the at least two first and second types of the image input module to ensure that the digital image data provided by the second type is placed before the digital image data provided by the first type, wherein
the second type of the image input module is provided with a real-time image, and the image input arbitration module does not process the real-time image by a processing time for the image input arbitration module to process the digital image data provided by the first type of the image input module, and
compressing and encoding the digital image data via an image encoding module.

18. An image recording method of compressing and encoding a plurality of images for recording onto a recording medium in an image recording apparatus or an image recording system, the image recording method comprising:
capturing, via at least two first and second types of an image input module, an image of one or more frames from a video signal source, and converting the image into digital image data for output;
arbitrating, via an image input arbitration module, an order of the digital image data provided by the at least two first and second types of the image input module to ensure that the digital image data provided by the second type is placed before the digital image data provided by the first type, wherein
the second type of the image input module is provided with a real-time image,
temporarily storing, via a memory module, the real-time image by a processing time for the image input arbitration module to process the digital image data provided by the first type of the image input module;
compressing and encoding the digital image data via an image encoding module; and
reading, via a send-out module, compressed image data recorded on the recording medium, and assembling the compressed image data into a packet at a predetermined timing set by a user for sending out to a network.

19. An image recording method of compressing and encoding a plurality of images for recording onto a recording medium in an image recording apparatus or an image recording system, the image recording method comprising:
- capturing, via at least two first and second types of an image input module, an image of one or more frames from a video signal source, and converting the image into digital image data for output;
- arbitrating, via an image input arbitration module, an order of the digital image data provided by the at least two first and second types of the image input module to ensure that the digital image data provided by the second type is placed before the digital image data provided by the first type;
- capturing, via at least two first and second types of an audio input module, an audio from an audio signal source, and converting the audio into digital audio data for output;
- arbitrating, via an audio input arbitration module, an order of the digital audio data provided by the at least two first and second types of the image input module to ensure that the digital audio data provided by the second type is placed before the digital audio data of the first type, wherein
- the second type of the image input module is provided with a real-time image,
- temporarily storing, via a memory module, the real-time image by a processing time for the image input arbitration module to process the digital image data provided by the first type of the image input module;
- compressing and encoding the digital image data via an image encoding module, and
- changing, via the image encoding module, a processing speed to perform a process of compression and encoding more in real time,
- wherein the second type of the audio input module is provided with a real-time audio, the image recording method further comprising:
- temporarily storing, via a memory module, the real-time audio by a processing time for the audio input arbitration module to process the digital audio data provided by the first type of the audio input module;
- compressing and encoding the digital audio data via an audio encoding module, and
- changing, via the audio encoding module, a processing speed to perform a process of compression and encoding more in real time.

20. An image recording method of compressing and encoding a plurality of images for recording onto a recording medium in an image recording or an image recording system, the image recording method comprising:
- capturing, via at least two first and second types of an image input module, an image of one or more frames from a video signal source, and converting the image into digital image data for output;
- arbitrating, via an image input arbitration module, an order of the digital image data provided by the at least two first and second types of the image input module to ensure that the digital image data provided by the second type is placed before the digital image data provided by the first type;
- capturing, via at least two first and second types of an audio input module, an audio from an audio signal source, and converting the audio into digital audio data for output;
- arbitrating, via an audio input arbitration module, an order of the digital audio data provided by the at least two first and second types of the audio input module to ensure that the digital audio data provided by the second type is placed before the digital audio data of the first type, wherein the second type of the image input module is provided with a real-time image, and the image input arbitration module does not process the real-time image by a processing time for the image input arbitration module to process the digital image data provided by the first type of the image input module,
- applying, via an image encoding module, the process of compression and encoding to the digital image data, wherein the second type of the audio input module is provided with a real-time audio, and the audio input arbitration module does not process the real-time audio by a processing time for the audio input arbitration module to process the digital audio data provided by the first type of the audio input module, and the image recording method further comprising:
- compressing and encoding the digital audio data via an audio encoding module.

* * * * *